United States Patent [19]

Kaiya et al.

[11] Patent Number: 4,956,206

[45] Date of Patent: Sep. 11, 1990

[54] RELEASE COMPOSITION

[75] Inventors: Nobuo Kaiya; Shosaku Sasaki, both of Chiba, Japan

[73] Assignee: Toray Silicone Company, Ltd., Tokyo, Japan

[21] Appl. No.: 311,314

[22] Filed: Feb. 15, 1989

[30] Foreign Application Priority Data

Feb. 18, 1988 [JP] Japan .................................. 63-35569

[51] Int. Cl.$^5$ .............................................. B05D 3/02
[52] U.S. Cl. ...................................... 427/387; 528/14; 528/15; 528/32; 528/34; 556/462; 556/467; 427/388.1; 427/393.5
[58] Field of Search ....................... 528/14, 32, 15, 84; 556/462, 467; 427/387, 388.1, 393.5

[56] References Cited

U.S. PATENT DOCUMENTS 4,057,596 11/1977 Takamizawa et al. ................ 528/32
4,631,208 12/1986 Westall .................................... 528/34

*Primary Examiner*—Melvyn I. Marquis
*Attorney, Agent, or Firm*—George A. Grindahl

[57] ABSTRACT

An adhesive release composition containing specific amounts of an organopolysiloxane bearing oxyalkylene groups and alkenyl groups, an organohydrogenpolysiloxane, and a platinum-type catalyst is characterized by the formation, on various base surfaces, of a release surface having an excellent printability and a stable release force. For example, a roll of pressure sensitive adhesive tape of this invention can be easily unrolled, durably adhered to an article and clearly printed with ink on its adhesive-releasing surface which bears the release composition of this invention.

14 Claims, No Drawings

RELEASE COMPOSITION

BACKGROUND OF THE INVENTION

The present invention relates to an adhesive release composition. More specifically, the present invention relates to a composition for a release agent which has stable release properties relative to tacky substances as well as an excellent printability.

It is known that organopolysiloxane release compositions, when coated on the surface of a base, for example, various types of paper, synthetic resin films, fibers, aluminum, etc., have excellent release properties for tacky substances. These organopolysiloxane release compositions may have a condensation-reaction curing mechanism {refer to Japanese Patent Publication Nos. 35-13709 (13,709/60) and 36-1397 (1,397/61)} or an addition-reaction curing mechanism {refer to Japanese Patent Publication No. 46-26798 (26,798/71)}.

However, while the above release agents do impart excellent release properties to various bases, the coated surfaces are almost unprintable. Thus, characters cannot be written or placed on such surfaces using inks such as printing inks or magic ink.

Tacky sheet or tacky tape is generally wound into roll form for use, wherein the tacky layer (coating of tacky adhesive on the sheet or tape base) and a release layer (opposite-side coating of organopolysiloxane composition) then become superposed and meet. It is often the case that such a tacky sheet must be printed in the course of its utilization. Due to the poor printability of this release layer surface, it has heretofore been necessary to install or arrange, for example, fine-quality paper with good printability, between the tacky layer and the back of the sheet base. Furthermore, when a tacky tape is used for packing, for example, with cardboard, such items as addresses, etc., cannot be written on the tape.

BRIEF SUMMARY OF THE INVENTION

The object of the present invention is to solve the above problems by the introduction of an adhesive release composition which has an excellent printability and releasability.

The above object, and others which will become apparent upon consideration of the following specification and appended claims, is achieved by an adhesive release composition based on (A) a new oxyalkylene group-containing organopolysiloxane having at least 3 silicon-bonded alkenyl groups in each molecule, (B) an organohydrogenpolysiloxane having at least 3 silicon-bonded hydrogen atoms in each molecule, and (C) a platinum-type catalyst.

DETAILED DESCRIPTION OF THE INVENTION

To explain this in greater detail, the present invention relates to an adhesive release composition comprising (A) 100 weight parts of an oxyalkylene group-containing organopolysiloxane having at least 3 silicon-bonded alkenyl groups in each molecule, as expressed by the formula $R^2(R^1R^3SiO)_x(R^1{}_2SiO)_ySiR^1{}_2R^2$, wherein $R^1$ is a monovalent hydrocarbon group; $R^2$ is selected from the group consisting of the hydroxyl group, an $R^1$ group, and an $R^3$ group; $R^3$ is a group having the formula $-(R^4)_a-O-(R^5O)_zR^6$ wherein $R^4$ and $R^5$ are alkylene groups having 2 to 6 carbon atoms; $R^6$ is the hydrogen atom or a monovalent organic group having 1 to 10 carbon atoms, a is one or zero, z has an average value of from 1 to 100; and x and y are greater than or equal to one, with the provisos that y/x has an average value of 0.1 to 100 and (x+y) has an average value of at least 10; (B) 0.5 to 20 weight parts of an organohydrogenpolysiloxane having at least 3 silicon-bonded hydrogen atoms in each molecule; and (C) a catalytic quantity of a platinum group metal-containing catalyst.

Component (A) used by the present invention is new and the crucial component for equipping the release surface with printability. This component is an oxyalkylene-containing organopolysiloxane having the formula $R^2(R^1R^3SiO)_x(R^1{}_2SiO)_ySiR^1{}_2R^2$.

In the above formula $R^1$ is a monovalent hydrocarbon group, and is exemplified by alkyl groups such as methyl, ethyl, propyl, butyl, octyl, tridecyl, and cyclohexyl; aryl groups such as phenyl and tolyl; and alkenyl groups such as vinyl and allyl. From the standpoint of crosslinking with Component (B), it is essential that at least three groups $R^1$ in each molecule be alkenyl groups. From the standpoint of the release properties, it is preferred that methyl comprise at least 80 mole % of $R^1$.

In the above formula for Component (A) $R^2$ is the hydroxyl group, an $R^1$ group, or an $R^3$ group and $R^3$ is a group with the formula $-(R^4)_a-O-(R^5O)_zR^6$. In the formula for $R^3$, $R^4$ and $R^5$ are alkylene groups having 2 through 6 carbon atoms. Examples in this regard are the ethylene group, propylene group, isopropylene group, butylene group, and isobutylene group. When z, which can have a value of from 1 to 100, has a value of two or more, $R^5$ can be the same species or the combination of different species. $R^6$ is the hydrogen atom or a monovalent organic group having 1 to 10 carbon atoms. This monovalent organic group having 1 to 10 carbon atoms is exemplified by monovalent hydrocarbon groups such as methyl, ethyl, propyl, butyl, vinyl, and phenyl; and by acyl groups such a acetyl and propionyl.

In the formula for $R^3$ a has a value of one or zero. A value of one is preferred from the standpoint of stability against hydrolysis.

In the formula for Component (A) x and y are each integers with values of at least 1, with the provisos that y/x is 0.1 to 100 and (x+y) is at least 10. When (x+y) is not at least 10, the coatability on the base is unsatisfactory for practical use. The printability is low when y/x exceeds 100, while stable release properties relative to tacky substances are not obtained when this value is less than 0.1.

Component (A) can be obtained, for example, by a condensation reaction between an alkenyl group-containing, hydroxyl group-terminated diorganopolysiloxane and an oxyalkylene group-containing dichlorosilane.

Component (B) is a crosslinking agent for Component (A), and comprises an organohydrogenpolysiloxane having at least 3 silicon-bonded hydrogen atoms in each molecule and having the average unit formula $R^7{}_bSiO_{(4-b)/2}$. Each $R^7$ in this formula is either the hydrogen atom or a monovalent hydrocarbon group which does not contain alkenyl groups. The monovalent hydrocarbon groups in this regard are exemplified by those listed for $R^1$ in Component (A) with the exclusion of the alkenyl groups. In the formula for Component (B) b has a value of 1.5 to 3.0, preferably from 1.9 to 2.1.

With regard to the degree of polymerization of Component (B), i.e., the number of silicon atoms in an average molecule of (B), it should be at least 2, while the upper limit is not crucial. Its molecular configuration is also not crucial, and may be any of straight chain, branched chain, branched, cyclic, or network.

Concrete examples of Component (B) are as follows: dimethylhydrogensiloxy-terminated dimethylsiloxane-methylhydrogensiloxane copolymers, trimethylsiloxy-terminated dimethylsiloxane-methylhydrogensiloxane copolymers, dimethylphenylsiloxy-terminated dimethylsiloxane-methylhydrogensiloxane copolymers, trimethylsiloxy-terminated methylhydrogenpolysiloxanes, cyclic methylhydrogenpolysiloxanes, and copolymers constituted of dimethylhydrogensiloxane units and $SiO_2$, units. These may be used as the single species or as combinations of 2 or more species.

Component (B) is used at 0.5 to 20 weight parts per 100 weight parts Component (A). When this quantity of addition is less than 0.5 parts, the curing rate is slow and the productivity is reduced. Exceeding 20 parts lowers the printability.

Component (C) is a platinum group metal-containing catalyst for the crosslinking reaction between Component (A) and Component (B). Concrete examples of this component are chloroplatinic acid, alcohol-modified chloroplatinic acid, olefin complexes of chloroplatinic acid, complexes between chloroplatinic acid and vinylsiloxanes, complexes between chloroplatinic acid and ketones, solid platinum supported on an alumina or silica carrier, platinum black, and palladium- and rhodium-containing catalysts. This component is to be added in a quantity sufficient to cure the composition under consideration. In other words, as long as a catalytic quantity is used, the quantity of addition can be selected without restriction from a consideration of the coating conditions, etc. In general, this component is added in a quantity giving 10 to 1,000 ppm as platinum-group metal based on the total quantity of components (A) and (B).

The adhesive release composition of the present invention may be used as such, or it may be applied after being mixed with one or more optional components such as, for example, organic solvents, organic solvent-soluble organopolysiloxane resins, addition-reaction retarders, pigments, macromolecular hydrocarbons, etc.

Concrete examples of the aforesaid organic solvent are aromatic hydrocarbons such as benzene, toluene, and xylene; aliphatic hydrocarbons such as heptane, hexane, and pentane; halogenated hydrocarbons such as trichloroethylene and perchloroethylene; as well as ethyl acetate, methyl ethyl ketone, and methyl isobutyl ketone.

The adhesive release composition of the present invention can be coated and cured onto base surfaces, such as various types of paper, synthetic resin films, fibers, aluminum, etc., which are desired to be printable or writable by water-based inks (for example, inks for fountain pens, water-based pens, printers) or oil-based inks (for example, magic ink, printing inks, etc.). It can also be used as a release agent for pressure-sensitive tapes, labels, etc.

The present invention is explained in greater detail, but not limited, by means of the following illustrative examples. In these examples, parts=weight parts, and the viscosity is the value at 25 degrees Centigrade. Me denotes the methyl group and Vi denotes the vinyl group. The peeling resistance, residual adhesion, and printability were measured under the following conditions.

Peeling Resistance

The adhesive release composition was applied at the specified quantity on the surface of a sheet-form base. After the formation of a cured film at the specified temperature for the specified time, the film surface was coated with Oribine BPS-5127 (acrylic-based pressure-sensitive adhesive from Toyo Ink Mfg. Co., Ltd.) or Oribine BPS-2411 (rubber-based pressure-sensitive adhesive from Toyo Ink Mfg. Co., Ltd.), and this preparation was heated for 2 minutes at 70 degrees Centigrade. Backing paper was then overlaid, and aging was carried out for the specified time (1 day and 60 days) at 25 degrees Centigrade under a load of 20 $g/cm^2$. The aged test specimen was cut to a width of 5 cm, the backing paper was then peeled at 180 degrees at a rate of 30 cm/minute using a tensile tester, and the force required for separation was measured in grams.

Residual Adhesion

A cured film was formed on the surface of the base sheet as in the measurement of the peeling resistance, and Nitto Polyester Tape 31B (brandname of Nippon Electric Co., Ltd.) was then applied to this surface. A load of 20 $g/cm^2$ was applied, followed by heating for 20 hours at 70 degrees Centigrade, and the tape was then peeled off and re-applied to stainless steel plate. The force (in grams) required to separate this treated tape from the stainless steel plate was then measured (180 degree peel, rate=30 cm/minute). This value is reported as the percentage of the force (in grams) required to peel the untreated reference tape from stainless steel plate.

Printability

A cured film was formed on the surface of the base sheet as in the measurement of the peeling resistance, and characters were written on this surface using magic ink (oil-base). Evaluation was carried out based on the absence of crawling or cissing and whether the writing was clean and well-formed.

Reference Example 1

The following were charged to a four-neck flask equipped with a stirrer, reflux condenser, and thermometer and were heated to 100 degrees Centigrade with stirring: 100 parts polysiloxane with the formula $HO(Me_2SiO)_{4-8}(MeViSiO)_2H$, 32 parts sodium bicarbonate, and 300 parts toluene. 118.5 Parts oxyalkylene-containing methyldichlorosilane with the formula $MeCl_2SiCH_2CH_2CH_2O(C_2H_4O)_{10}CH_3$ was then dripped in over two hours, followed by reaction for an additional two hours at the same temperature. This was cooled to 70 degrees Centigrade, 2 parts water was added, the reaction was filtered, and the solvent was removed in vacuo to give an oxyalkylene-containing organopolysiloxane (Siloxane A) with the following formula.

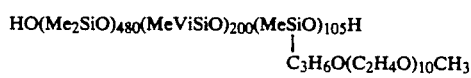

EXAMPLE 1

100 Parts oxyalkylene-containing organopolysiloxane (Siloxane A) as prepared in Reference Example 1, above, 3 parts trimethylsiloxy-terminated poly(methylhydrogen)siloxane (viscosity=20 centipoise), 342 parts toluene, and 801 parts methyl isobutyl ketone were combined and mixed to homogeneity. Subsequent addition of chloroplatinic acid/1,3-divinyl-1,1,3,3-tetramethyldisiloxane complex afforded Sample 1.

Sample 2, a composition of the present invention, was prepared entirely as for Sample 1, with the modification that 100 parts oxyalkylene-containing organopolysiloxane (Siloxane B) with the formula

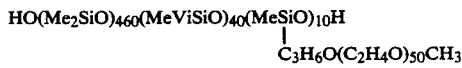

was added in place of Siloxane A in Sample 1.

Sample 3, also a composition of the present invention, was prepared entirely as for Sample 1, with the modification that 100 parts oxyalkylene-containing organopolysiloxane with the formula

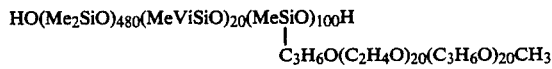

was added in place of Siloxane A in Sample 1.

In Comparison Example 1, a composition was prepared entirely as for Sample 1, with the modifications that 100 parts hydroxyl-terminated dimethylsiloxane-methylvinylsiloxane copolymer gum (vinyl content=1.0 weight %) was added in place of Siloxane A of Sample 1, and 897 parts toluene was used in place of the 342 parts toluene and 801 parts methyl isobutyl ketone.

The printability, peeling resistance, and residual adhesion of these compositions were evaluated by the methods described above. The conditions were as follows: coating at 1 g/m$^2$ as solids on polyethylene-laminated kraft paper, cured film formation by heating for 60 seconds at 180 degrees Centigrade, Oribine BPS-2411 (brandname cf Toyo Ink Mfg. Co., Ltd.) was the pressure-sensitive adhesive used in the peeling resistance test. The test results for the examples and comparison examples are reported in Table 1.

For Samples 1, 2, and 3 (release compositions of the present invention), magic ink crawling was completely absent and the written characters were clear and uniform, thus indicating a quite superior printability. Furthermore, the values for the peeling resistance and residual adhesion were also excellent. Compared to this, there was substantial magic ink crawling in Comparison Example 1, and the characters were blurred and could not be written clearly.

TABLE 1

|  | Printability | Peeling Resistance (g/5 cm) after 1 day | 60 days | Residual Adhesion (%) |
|---|---|---|---|---|
| Sample 1 | excellent | 62 | 64 | 91 |
| Sample 2 | excellent | 56 | 57 | 92 |
| Sample 3 | excellent | 60 | 59 | 90 |
| Comparison Example 1 | poor | 16 | 19 | 90 |

EXAMPLE 2

The following were mixed to homogeneity: 100 parts oxyalkylene-containing organopolysiloxane (Siloxane D) having the following structure

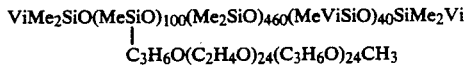

5 parts trimethylsiloxy-terminated methylhydrogenpolysiloxane (viscosity=5 centipoise), 310 parts toluene, and 835 parts methyl isobutyl ketone. This was followed by the addition of a chloroplatinic acid/olefin complex at 200 ppm as platinum metal, and a composition of the present invention (Sample 4) was prepared by thorough mixing.

Another composition of the present invention, Sample 5, was prepared entirely as for Sample 4, with the modification that 100 parts oxyalkylene-containing organopolysiloxane (Siloxane E) with the following structure was added in place of Siloxane D in Sample 4.

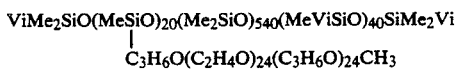

As Comparison Example 2, a composition was prepared in an entirely similar manner, but using 100 parts oxyalkylene-containing organopolysiloxane with the following structure in place of Siloxane D in Sample 4.

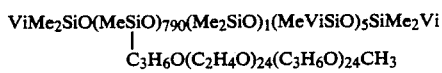

As Comparison Example 3, a composition was prepared in an entirely similar manner, but using 100 parts oxyalkylene-containing organopolysiloxane with the following structure in place of Siloxane D in Sample 4.

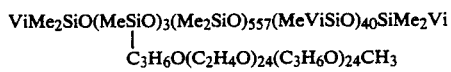

These compositions were evaluated for their peeling resistance, residual adhesion, and printability under the following conditions: coating at 1.2 g/m$^2$ as solids on glassine paper, heating for 60 seconds at 180 degrees Centigrade. These results are reported in Table 2. The pressure-sensitive adhesive used in the peeling resistance test was Oribine BPS-8170 (brandname of Toyo Ink Mfg. Co., Ltd.). The test results for the examples and comparison examples are reported in Table 2.

Samples 4 and 5 (compositions of the present invention) had a quite excellent printability: there was absolutely no magic ink crawling, and the characters could be written clearly and uniformly. Furthermore, their peeling resistance values were stable. Compared to this, the peeling resistance in Comparison Example 2 was so high as to be impractical, although the printability was excellent (no magic ink crawling, clear and uniform characters). The peeling resistance in Comparison Example 3 was low and thus excellent, but this composition suffered from substantial magic ink crawling and thus a very poor printability.

TABLE 2

| | Printability | Peeling Resistance (g/5 cm) after | | Residual Adhesion (%) |
|---|---|---|---|---|
| | | 1 day | 60 days | |
| Sample 4 | excellent | 89 | 90 | 90 |
| Sample 5 | excellent | 61 | 63 | 90 |
| Comparison Example 2 | excellent | 598 | 648 | 88 |
| Comparison Example 3 | poor | 24 | 26 | 93 |

EXAMPLE 3

The following were mixed to homogeneity: 100 parts oxyalkylene-containing organopolysiloxane with the following structure,

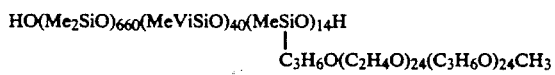

3 parts trimethylsiloxy-terminated polymethylhydrogensiloxane (viscosity=20 centipoise), 350 parts toluene, and 547 parts methyl ethyl ketone. A composition of the present invention, Sample 6, was then prepared by the addition with thorough mixing of chloroplatinic acid/1,3-divinyl-1,1,3,3-tetramethyldisiloxane complex sufficient to give 180 ppm as platinum metal.

Another composition of the present invention, Sample 7, was prepared entirely as for Sample 6, with the modifications that 6 parts methylhydrogenpolysiloxane was used instead of the 3 parts methylhydrogenpolysiloxane of Sample 6, and 347 parts toluene was used instead of 350 parts toluene.

Comparison Example 4 was prepared entirely as for Sample 6, with the modification that the quantity of addition of the poly(methylhydrogensiloxane) was 0.3 parts instead of the 3 parts in Sample 6. Comparison Example 5 was prepared again entirely as for Sample 6, with the modification that the quantity of addition of the methylhydrogenpolysiloxane was 40 parts instead of the 3 parts in Sample 6.

These compositions were each formed into cured films by coating on polyethylene-laminated kraft paper at 0.6 g/m² as solids and heating for 60 seconds at 180 degrees Centigrade, and were then evaluated for their peeling resistance, residual adhesion, and printability. These results are reported in Table 3. The pressure-sensitive adhesive used in the peeling resistance test was Oribine BPS-2411 (brandname of Toyo Ink Mfg. Co., Ltd.). These results are reported in Table 3.

Samples 6 and 7, which are compositions of the present invention, evidenced a quite superior printability: magic ink crawling was completely absent and the characters were uniformly and clearly written. Furthermore, they presented stable peeling resistance values.

Compared to this, Comparison Example 4 could not be cured under the conditions given above, while Comparison Example 5 had a poor printability due to magic ink crawling.

TABLE 3

| | Printability | Peeling Resistance (g/5 cm) after | | Residual Adhesion (%) |
|---|---|---|---|---|
| | | 1 day | 60 days | |
| Sample 6 | excellent | 48 | 49 | 92 |
| Sample 7 | excellent | 60 | 66 | 91 |
| Comparison Example 4 | — | — | — | — |
| Comparison Example 5 | poor | 84 | 96 | 95 |

EFFECTS OF THE INVENTION

Because the release agent of the present invention comprises a composition containing specified quantities of oxyalkylene-containing organopolysiloxane as Component (A), organohydrogenpolysiloxane as Component (B), and platinum-type catalyst as Component (C), it is characterized by the formation, on various base surfaces, of a release surface having an excellent printability and a stable release force.

That which is claimed is:

1. An adhesive adhesive release composition comprising: (A) 100 weight parts of an oxyalkylene group-containing organopolysiloxane having at least 3 silicon-bonded alkenyl groups in each molecule, as expressed by the formula $R^2(R^1R^3SiO)_x(R^1_2SiO)_ySiR^1_2R^2$, wherein $R^1$ is a monovalent hydrocarbon group; $R^2$ is selected from the group consisting of the hydroxyl group, an $R^1$ group, and an $R^3$ group; $R^3$ is a group having the formula $-(R^4)_a-O-(R^5O)_zR^6$ wherein $R^4$ and $R^5$ are alkylene groups having 2 to 6 carbon atoms; $R^6$ is the hydrogen atom or a monovalent organic group having 1 to 10 carbon atoms, a is one or zero, z has an average value of from 1 to 100; and x and y are greater than or equal to one, with the provisos that y/x has an average value of 0.1 to 100 and (x+y) has an average value of at least 10;

(B) 0.5 to 20 weight parts of an organohydrogenpolysiloxane having at least 3 silicon-bonded hydrogen atoms in each molecule; and (C) a catalytic quantity of a platinum group metal-containing catalyst.

2. An adhesive release composition according to claim 1 wherein the methyl group comprise at least 80% of $R^1$ groups and a has a value of 1.

3. An adhesive release composition according to claim 2 wherein Component (B) is a trimethylsiloxy-terminated poly(methylhydrogen)siloxane and Component (C) is a complex of chloroplatinic acid and 1,3-divinyl-1,1,3,3-tetramethyldisiloxane.

4. An adhesive release composition according to claim 3 wherein $R^2$ is the hydroxyl group.

5. An adhesive release composition according to claim 3 wherein $R^2$ is the vinyl group.

6. An oxyalkylene group-containing organopolysiloxane compound having at least 3 silicon-bonded alkenyl groups in each molecule, as expressed by the formula $R^2(R^1R^3SiO)_x(R^1_2SiO)_ySiR^1_2R^2$, wherein $R^1$ is a monovalent hydrocarbon group; $R^2$ is selected from the group consisting of the hydroxyl group, an $R^1$ group, and an $R^3$ group; $R^3$ is a group having the formula $-(R^4)_a-O-(R^5O)_zR^6$ wherein $R^4$ and $R^5$ are alkylene groups having 2 to 6 carbon atoms; $R^6$ is the hydrogen atom or a monovalent organic group having 1 to 10 carbon atoms, a is one or zero, z has an average value of from 1 to 100; and x and y are greater than or equal to one, with the provisos that y/x has an average value of 0.1 to 100 and (x+y) has an average value of at least 10.

7. An oxyalkylene group-containing organopolysiloxane compound according to claim 6 wherein the methyl group comprise at least 80% of $R^1$ groups and a has a value of 1.

8. An oxyalkylene group-containing organopolysiloxane compound according to claim 7 wherein $R^2$ is the hydroxyl group.

9. An oxyalkylene group-containing organopolysiloxane compound according to claim 7 wherein $R^2$ is the vinyl group.

10. A method comprising:
(I) preparing a coatable mixture, by mixing to homogenity, components comprising
   (A) 100 weight parts of an oxyalkylene group-containing organopolysiloxane having at least 3 silicon-bonded alkenyl groups in each molecule, as expressed by the formula $R^2(R^1R^3SiO)_x(R^1{}_2SiO)_y SiR^1{}_2R^2$, wherein $R^1$ is a monovalent hydrocarbon group; $R^2$ is selected from the group consisting of the hydroxyl group, an $R^1$ group, and an $R^3$ group; $R^3$ is a group having the formula $-(R^4)_a-O-(R^5O)_zR^6$ wherein $R^4$ and $R^5$ are alkylene groups having 2 to 6 carbon atoms; $R^6$ is the hydrogen atom or a monovalent organic group having 1 to 10 carbon atoms, a is one or zero, z has an average value of from 1 to 100; and x and y are greater than or equal to one, with the provisos that y/x has an average value of 0.1 to 100 and (x+y) has an average value of at least 10;
   (B) 0.5 to 20 weight parts of an organohydrogenpolysiloxane having at least 3 silicon-bonded hydrogen atoms in each molecule; and
   (C) a catalytic quantity of a platinum group metal-containing catalyst;
(II) coating the mixture of (I) onto a base substrate; and
(III) causing the coated mixture to cure to a solid.

11. A method according to claim 10 wherein the methyl group comprise at least 80 mole % of $R^1$ groups and a has a value of 1.

12. A method according to claim 11 wherein Component (B) is a trimethylsiloxy-terminated poly(methylhydrogen)siloxane and Component (C) is a complex of chloroplatinic acid and 1,3-divinyl-1,1,3,3-tetramethyldisiloxane.

13. A method according to claim 12 wherein $R^2$ is the hydroxyl group.

14. A method according to claim 12 wherein $R^2$ is the vinyl group.

* * * * *